(12) United States Patent
Gormley et al.

(10) Patent No.: US 10,701,574 B2
(45) Date of Patent: Jun. 30, 2020

(54) DOWNLINK INTERFERENCE DETECTION USING TRANSMISSION MATRICES

(71) Applicant: Spectrum Effect Inc., Seattle, WA (US)

(72) Inventors: Eamonn Gormley, Bothell, WA (US); Chaz Immendorf, Bothell, WA (US); Rekha Menon, Bothell, WA (US)

(73) Assignee: Spectrum Effect Inc., Kirkland, WA (US)

( * ) Notice: Subject to any disclaimer, the term of this patent is extended or adjusted under 35 U.S.C. 154(b) by 0 days.

(21) Appl. No.: 15/585,138

(22) Filed: May 2, 2017

(65) Prior Publication Data

US 2017/0238201 A1  Aug. 17, 2017

Related U.S. Application Data

(63) Continuation of application No. 14/191,264, filed on Feb. 26, 2014, which is a continuation-in-part of (Continued)

(51) Int. Cl.
*H04W 24/08* (2009.01)
*H04B 17/345* (2015.01)
*H04W 24/04* (2009.01)

(52) U.S. Cl.
CPC .......... *H04W 24/08* (2013.01); *H04B 17/345* (2015.01); *H04W 24/04* (2013.01)

(58) Field of Classification Search
CPC ...... H04L 43/00–43/50; H04L 5/0073; H04W 24/08
See application file for complete search history.

(56) References Cited

U.S. PATENT DOCUMENTS 7,826,847 B1 * 11/2010 Roskowski ....... H04W 36/0083
455/432.1
8,229,368 B1 * 7/2012 Immendorf ........... H04W 24/10
455/63.1
(Continued)

FOREIGN PATENT DOCUMENTS

KR   10-2013-0006818 A   1/2013
WO   WO 2005/032190 A1   4/2005
(Continued)

OTHER PUBLICATIONS

International Search Report and Written Opinion for PCT/US2014/018798, filed Feb. 26, 2014.
(Continued)

*Primary Examiner* — Gennadiy Tsvey

(57) ABSTRACT

A method of detecting downlink interference in a communications system may include selecting a set of user equipment for measuring interference and generating a downlink interference neighbor list for some or all of the user equipment in the set. Empty resource blocks that are common to base stations on each downlink interference neighbor list are identified, and signals that are received by the set of user equipment during the empty resource blocks are analyzed to detect interference. Certain aspects of the method may be practiced before or after an interference detection period. A system for detecting downlink interference is also provided.

18 Claims, 10 Drawing Sheets

Related U.S. Application Data application No. 14/022,654, filed on Sep. 10, 2013, now Pat. No. 9,572,055.

(60) Provisional application No. 61/886,018, filed on Oct. 2, 2013, provisional application No. 61/810,171, filed on Apr. 9, 2013.

(56) References Cited

U.S. PATENT DOCUMENTS

| | | | |
|---|---|---|---|
| 2003/0003906 A1* | 1/2003 | Demers | H04B 1/7107 455/424 |
| 2005/0064872 A1 | 3/2005 | Osseiran et al. | |
| 2007/0165569 A1* | 7/2007 | Kaminski | H04W 16/10 370/329 |
| 2008/0002628 A1* | 1/2008 | Bi | H04W 36/0083 370/335 |
| 2009/0186609 A1 | 7/2009 | Wu et al. | |
| 2009/0264142 A1* | 10/2009 | Sankar | H04L 5/0037 455/501 |
| 2010/0061315 A1* | 3/2010 | Cordeiro | H04W 72/082 370/329 |
| 2010/0197330 A1 | 8/2010 | Astely et al. | |
| 2011/0235598 A1 | 9/2011 | Hilborn | |
| 2011/0292890 A1* | 12/2011 | Kulkarni | H04W 72/0426 455/450 |
| 2011/0312328 A1 | 12/2011 | Choi et al. | |
| 2012/0002598 A1 | 1/2012 | Seo et al. | |
| 2012/0088535 A1* | 4/2012 | Wang | H04B 7/024 455/513 |
| 2012/0134280 A1* | 5/2012 | Rotvold | H04B 17/327 370/252 |
| 2013/0070605 A1* | 3/2013 | Ghosh | H04W 72/082 370/241 |
| 2013/0182583 A1* | 7/2013 | Siomina | H04W 24/10 370/252 |
| 2014/0029516 A1* | 1/2014 | Heo | H04W 72/0453 370/328 |
| 2014/0064133 A1* | 3/2014 | Kazmi | H04W 24/08 370/252 |
| 2014/0198683 A1* | 7/2014 | Ihm | H04B 7/0417 370/252 |
| 2014/0242982 A1* | 8/2014 | Yang | H04W 36/0083 455/434 |
| 2014/0286189 A1* | 9/2014 | Kang | H04B 7/0417 370/252 |

FOREIGN PATENT DOCUMENTS

| | | | |
|---|---|---|---|
| WO | WO 2012/068413 A1 | 5/2012 | |
| WO | WO 2012/089269 A1 | 7/2012 | |
| WO | WO 2012/148414 A1 | 11/2012 | |

OTHER PUBLICATIONS

International Search Report and Written Opinion for PCT/US2013/067626, filed Oct. 30, 2013.

* cited by examiner

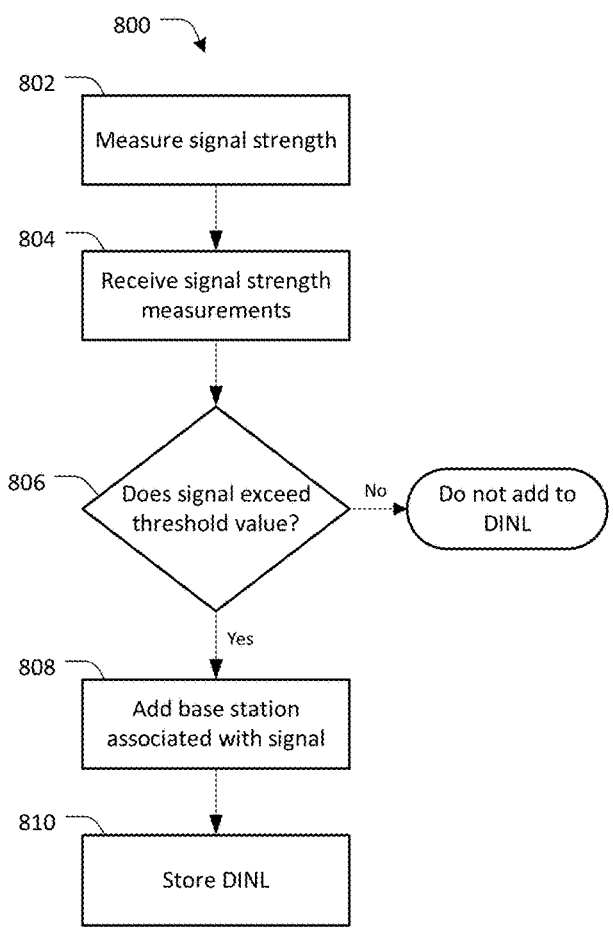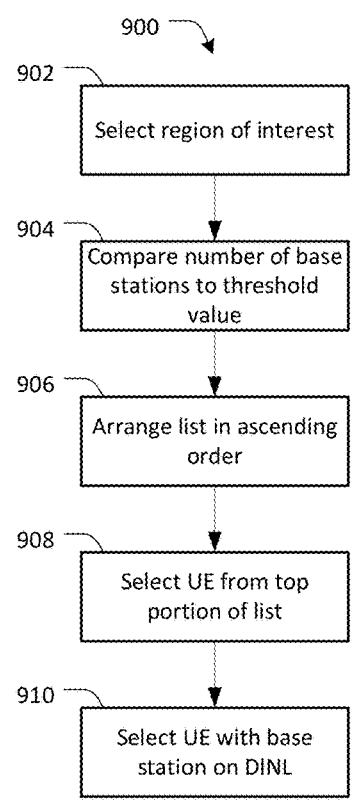
Fig. 8
Fig. 9

DOWNLINK INTERFERENCE DETECTION USING TRANSMISSION MATRICES

CROSS-REFERENCES TO RELATED APPLICATIONS

This disclosure is a continuation of U.S. application Ser. No. 14/191,264, filed Feb. 26, 2014, which claims priority to U.S. Provisional Application No. 61/886,018, filed Oct. 2, 2013, which is incorporated by reference herein, and is a Continuation-in-Part of U.S. application Ser. No. 14/022,654 filed Sep. 10, 2013, which claims priority to U.S. Provisional Application No. 61/810,171 filed Apr. 9, 2013.

BACKGROUND OF THE INVENTION

Wireless network operators pay large amounts of money to license wireless spectrum for their networks. They therefore carefully locate base stations and configure radio parameters to maximize the usage efficiency of the available spectrum. However, on many occasions unlicensed users operate devices that cause interference to user equipment associated with the licensed base stations. This degrades the performance of the licensed equipment, resulting in poor quality voice calls, dropped calls, a reduction in throughput in data networks, etc. Alternatively, if the cellular network is not the primary licensee of a spectrum allocation, a process to detect wireless transmissions from the primary users is desired.

BRIEF SUMMARY OF THE INVENTION

In this disclosure, techniques to detect and characterize signals received from external systems in the downlink of the cellular network system are described. These signals appear as interference to the cellular network system.

In an embodiment, a method of detecting downlink interference in a communications system includes selecting a set of user equipment for measuring interference, generating downlink interference neighbor lists for user equipment of the set of user equipment, identifying, empty resource blocks common to each list of neighboring base stations for each list of neighboring base stations, identifying empty resource blocks common to base stations of each downlink interference neighbor list, and analyzing signals received by the set of user equipment during the empty resource blocks to detect interference. The order in which these steps are performed may vary between different embodiments.

Selecting the set of user equipment may include designating user equipment in a region of interest and adding the user equipment in the region of interest to the set of user equipment. In another embodiment, selecting the set of user equipment includes comparing a number of base stations on a downlink interference neighbor list for first user equipment to a threshold value and adding the first user equipment to the set of user equipment when the number of base stations is less than the threshold value. In another embodiment, selecting the set of user equipment includes arranging a plurality of user equipment in ascending order according to a number of base stations on each downlink interference neighbor list of the plurality of user equipment, adding user equipment from an upper portion of the list to the set of user equipment, and excluding a lower portion of the list from the set of user equipment.

In another embodiment, selecting the set of user equipment includes designating a first base station, determining whether the first base station is on a downlink interference neighbor list of a user equipment, and when the first base station is on the downlink interference neighbor list of the user equipment, adding the user equipment to the set of user equipment. Although several aspects of selecting the set of user equipment have been described as various embodiments, it is possible to combine aspects within the same embodiment.

In an embodiment, a downlink interference neighbor list is generated for each user equipment in the set of user equipment. Generating the downlink interference neighbor lists may include receiving neighboring base station signals from user equipment at a base station, comparing the neighboring base station signals to a threshold value, and when a base station signal exceeds the threshold value, adding a base station associated with the base station signal to a downlink interfering neighbor list of the user equipment that detected the base station signal.

In an embodiment, identifying the empty resource blocks includes generating transmission matrices for base stations on the downlink interfering neighbor lists and collating the transmission matrices to identify the empty resource blocks. Identifying the resource blocks may further include comparing a number of user equipment attached to a first base station to a number of base stations on downlink interfering neighbor lists of the user equipment to generate a first value, when the first value exceeds a threshold value, collating the transmission matrices at the first base station, and when the first value is less than the threshold value, collating the transmission matrices at a central computing device of the system. In an embodiment, identifying the resource blocks includes determining a frequency at which a first base station appears on downlink interfering neighbor lists of a plurality of user equipment of the set of user equipment, and comparing the frequency to a threshold value, wherein only base stations whose frequency exceeds the threshold value are included in the collating.

In an embodiment, known interference may be removed from signals received by the set of user equipment during the empty resource blocks. Base station resources may be allocated to change the location of empty resource blocks in a transmission schedule. In an embodiment, identifying the empty resource blocks is performed after the signals have been received by the set of user equipment during the empty resource blocks.

BRIEF DESCRIPTION OF THE DRAWINGS

FIG. 8 illustrates a process for creating a downlink interference neighbor list according to an embodiment.

FIG. 9 illustrates a process for selecting a set of user equipment according to an embodiment.

FIGS. 13A and 13B illustrate embodiments of scheduling empty resource blocks according to an embodiment.

DETAILED DESCRIPTION OF THE INVENTION

Figure 1:
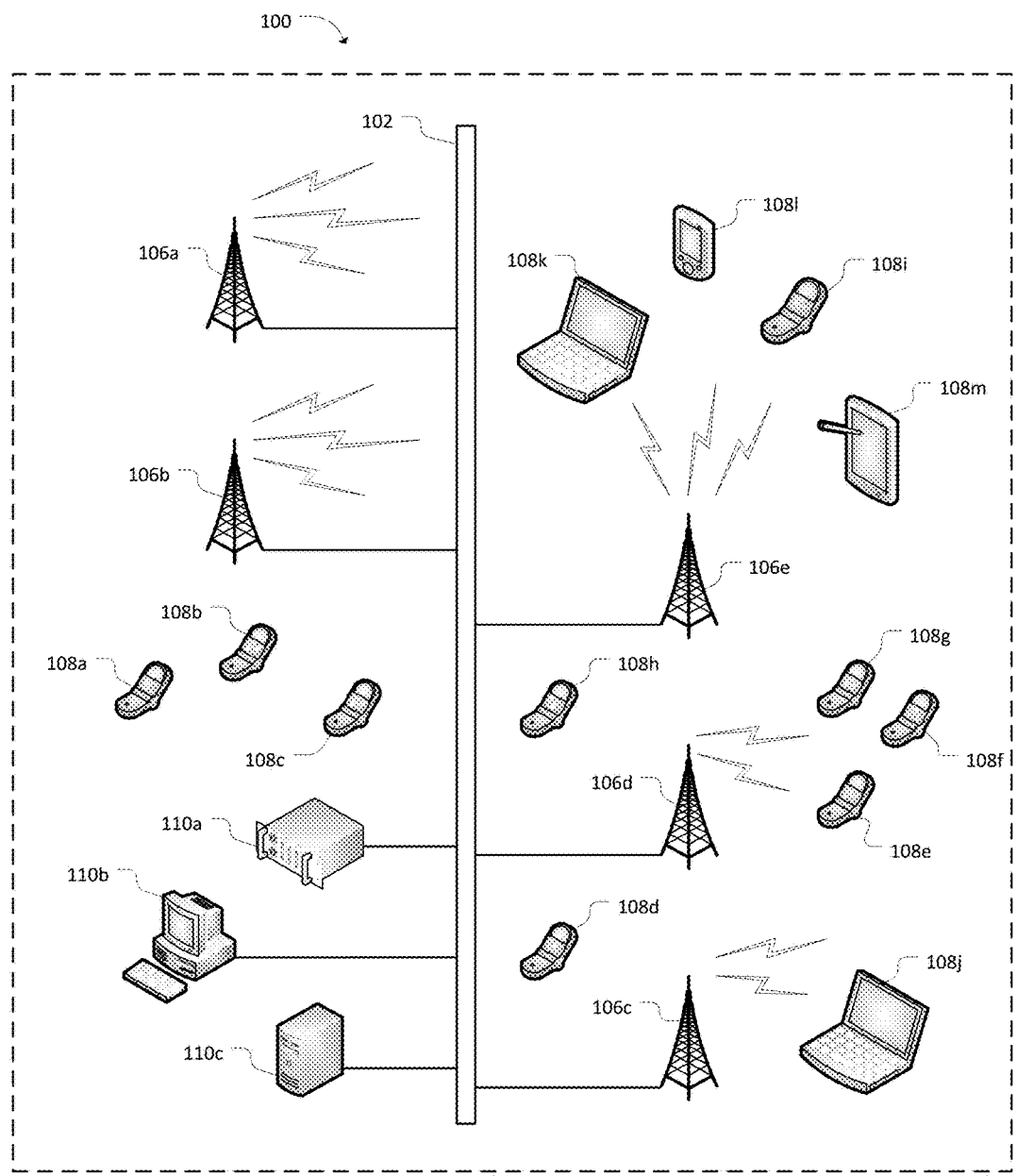
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates an example networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations include macrocells, microcells, picocells, and femtocells.

In a system 100 according to an embodiment of the present invention, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure. Further, processes for detecting interference may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110*a-c*, the base stations 106*a-e*, as well as any of the UE 108*a-m* may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110*a-c*, or any of the base stations 106*a-e* may employ any number of common server, desktop, laptop, and personal computing devices.

In an embodiment, any of the UE 108*a-m* may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106*a-e*) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
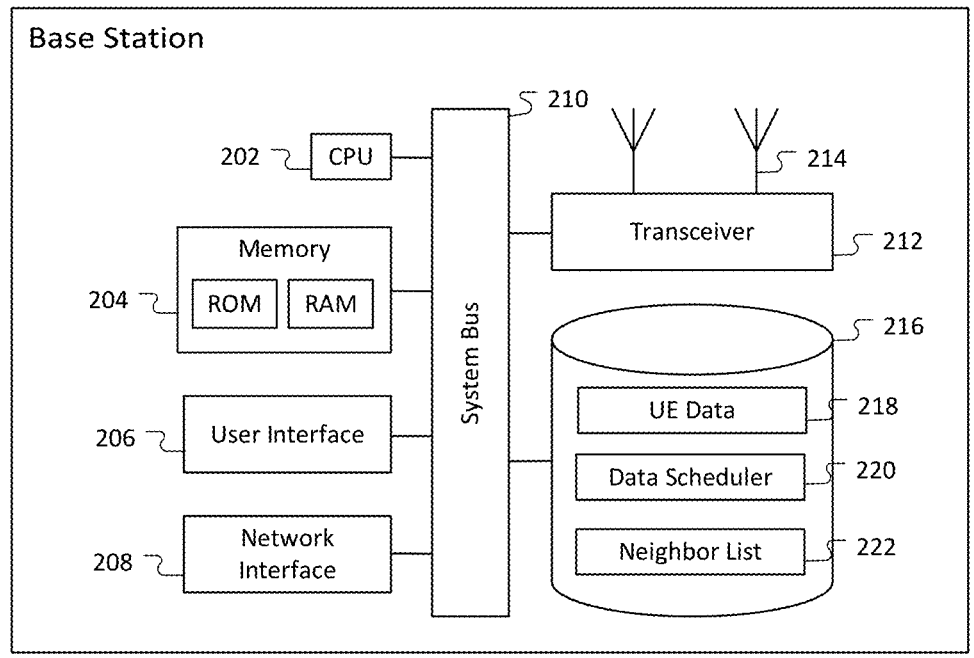
FIG. 2 illustrates a network resource controller according to an embodiment.

FIG. 2 illustrates a block diagram of a base station 200 (e.g., a femtocell, picocell, microcell or macrocell) that may be representative of the base stations 106*a-e* in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive scheduling information to and from an NRC, transmit signal data to an NRC, and share UE data with other base stations through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data device 216 and CPU 202 which executes the program. In an embodiment, data storage 216 may store UE data 218, a data scheduler 220, and a neighbor list 222. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108*a-m* via any Cellular Data Communications Protocol, including any common GSM, UMTS, WiMAX or LTE protocol.

Figure 3:
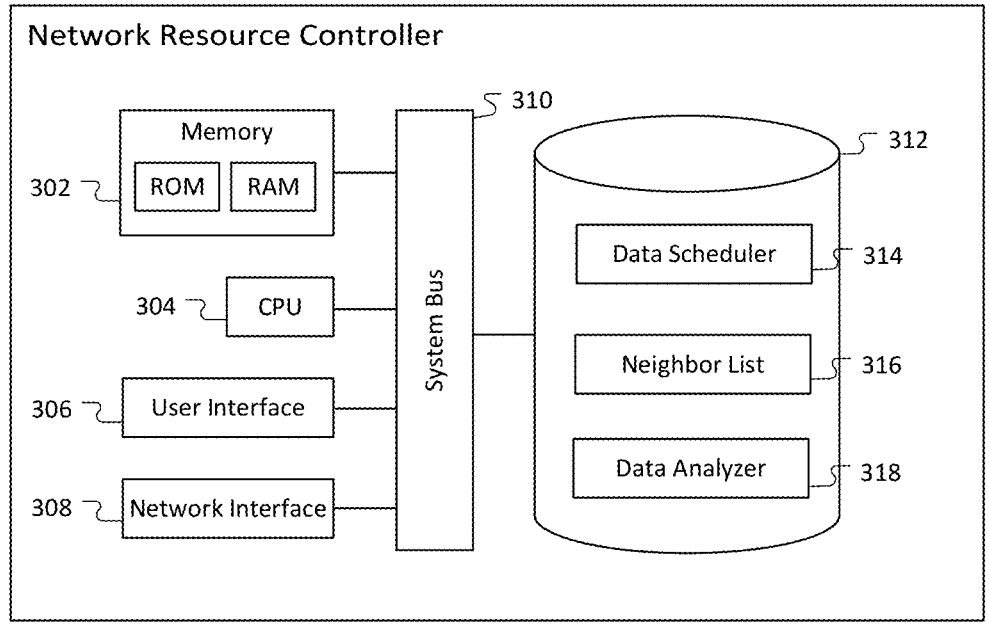
FIG. 3 illustrates a base station according to an embodiment.

FIG. 3 illustrates a block diagram of an NRC 300 that may be representative of any of the network controller devices 110*a-c*. In an embodiment, one or more of the network controller devices 110*a-c* are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may include a data scheduler 314, neighbor list information 316, and data analyzer 318.

In an embodiment, data scheduler 314 controls the uplink and downlink transmissions in the cellular network. Various embodiments may have a data scheduler 314 in an NRC 300 as an alternative or in addition to the data scheduler 220 that may be included in base station 200. A radio resource manager (RRM), which may be embodied as an NRC 300, informs each of the data schedulers 220 and/or 314 in the network of the frequency and time resources on which they can transmit and receive data. The RRM is usually located at a centralized location in the network, where it can communicate to all the data schedulers in the network. Data analyzer 318 may include program information for executing one or more form of data analysis described below, such as triangulation to identify a location of a source of interference.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110*a-c*, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

In a wireless system, data schedulers control the uplink and downlink transmissions in the network. The data schedulers can either reside at the base stations (e.g. eNodeBs in an LTE network) in the network or at a centralized location (e.g. RNC in UMTS networks). An RRM informs each of the data schedulers in the network of the frequency and time resources on which they can transmit and receive data. The RRM is usually located at a centralized location in the network, where it can communicate to all the data schedulers in the network. Each of the data scheduling entities may correspond to an NRC, and be described as an NRC in this disclosure.

Figure 4:
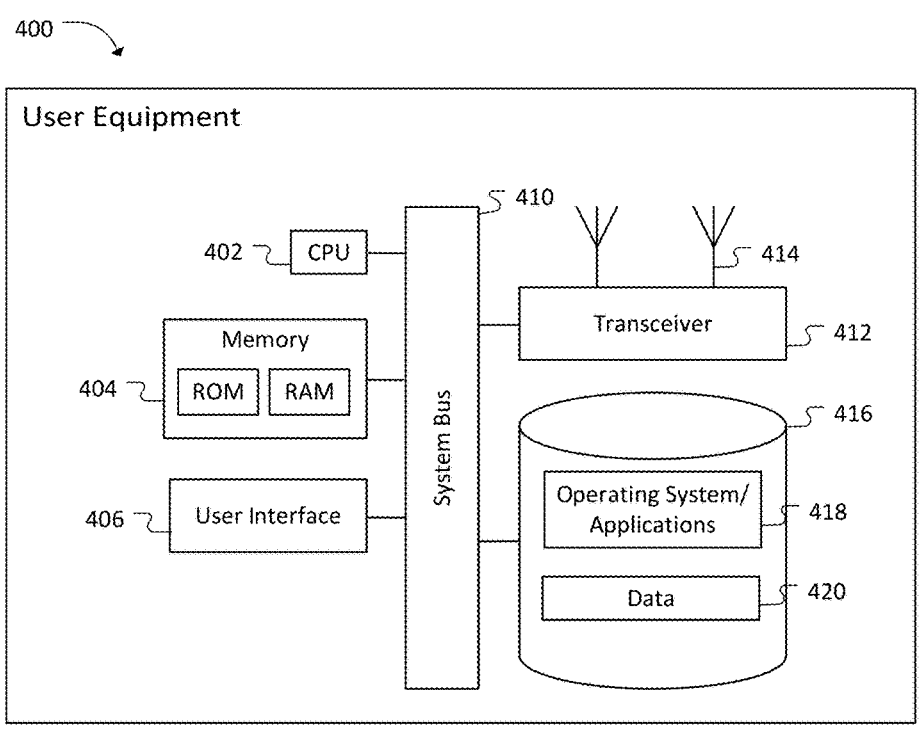
FIG. 4 illustrates user equipment according to an embodiment.

FIG. 4 illustrates a block diagram of user equipment 400 that may be representative of any of UEs 108 shown in FIG. 1. User equipment 400 may include a CPU 402, a memory 404, a user interface 406, a transceiver 412 including antenna 414, and storage device 416. Each of the components may communicate with one another through system bus 410. Storage device 416 may include operating system and applications 418 as well as data 420, which is data that is transmitted wirelessly through transceiver 412.

At base stations in a wireless communications system, downlink transmissions are not scheduled to all the attached UEs in all available time and frequency transmission resources, or resource blocks (RBs). UEs could utilize transmission resources in which they are not scheduled any transmission to make RF measurements. These measurements could then potentially be used for external interference detection. However, neighboring base stations could schedule downlink transmissions in these same resources. In this case, it may not be possible to differentiate external interference transmissions from transmissions associated with neighboring base stations (referred to here as system interference).

One way to address this issue is to schedule quiet times across the entire cellular network. However, this could impact the capacity and throughput of the network. Alternatives are proposed in this disclosure. Using the concept of downlink transmission matrices, the transmissions of neighboring base stations are collated to find empty transmission resources that can be used for external interference detection at the UEs. Accordingly, an embodiment may detect downlink interference without explicitly scheduling quiet times in the network.

Once the transmissions are detected, the cellular network can elect to not use portions of the spectrum on which other radiating sources have been detected. For example, in an LTE system, if narrowband transmissions are detected at LTE eNodeBs then a data scheduler at the eNodeBs can ensure that transmissions are not scheduled to UEs on the frequencies used by the narrowband source.

Figure 5:
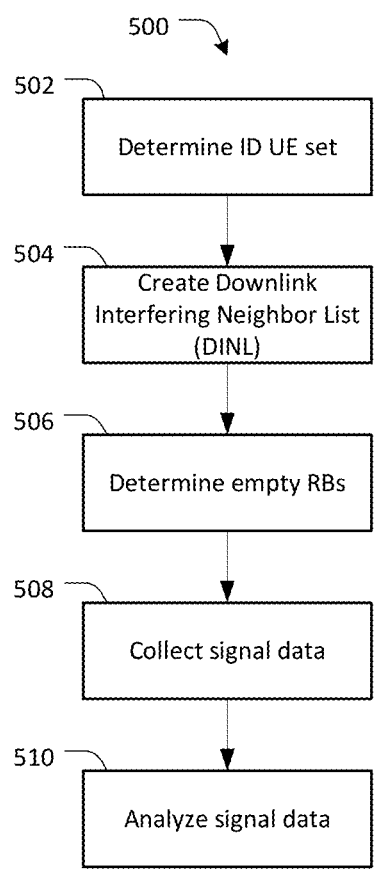
FIG. 5 illustrates a process for detecting downlink interference according to an embodiment.

FIG. 5 illustrates a process 500 for detecting downlink interference according to an embodiment. Specific examples and embodiments of aspects of process 500 are explained in more detail with respect to other processes described below.

In step 502, a set of UE which are used to facilitate downlink interference detection are determined. The set of UE may be referred to as an Interference Detection (ID) UE set. The ID UE set measure interference in downlink frequencies In step 504, a downlink interfering neighbor list (DINL) is created for each UE in the ID UE set. The DINL includes base stations whose transmissions are received by the UE above a threshold level.

In step 506, empty RBs are determined for base stations on DINLs. Empty RBs are RBs in which no transmissions are scheduled from neighboring base stations on a DINL. Identifying empty RBs may comprise collating transmission matrices of base stations on one or more DINL.

In step 508, signal data is collected by UE. The signal data may be collected by measuring signals during empty RBs and transmitting the measurement data to a base station or NRC.

In step 510, signal data is analyzed. Analyzing signal data 510 may include comparing the signal data to a threshold value to determine the presence of interference. The signal data may be analyzed with respect to frequency, location, strength, periodicity, etc. in order to characterize interference in downlink transmission frequencies.

The concept of a transmission matrix according to embodiments of the present invention will now be explained with respect to FIGS. 6A and 6B. A base station can transmit N downlink RBs over a predetermined period, which is typically a number of milliseconds. An RB, as referred to herein, represents a unit of time and frequency resources.

For example, in an LTE system, an RB spans 0.5 ms in the time domain and 180 KHz in the frequency domain. Hence, a base station that can transmit downlink transmissions over a bandwidth of 540 KHz sends 6 RBs every millisecond. In the example show in FIG. 6A, the 6 RBs may be expressed in a single row where N=6. Thus, although the Y-axis of the matrix is expressed in progressive time units, RBs that occur sequentially may be assigned to the same row depending on the value of N. The transmission period is referred to here as the interference detection time period, or ID period, and is configurable for the network.

Figure 6A:
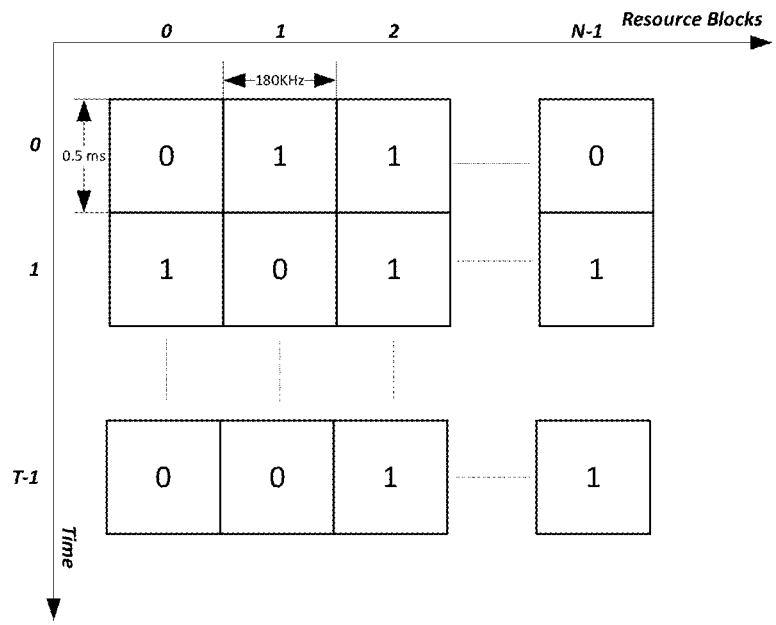
FIGS. 6A and 6B illustrate transmission matrices according to an embodiment.
Figure 6B:
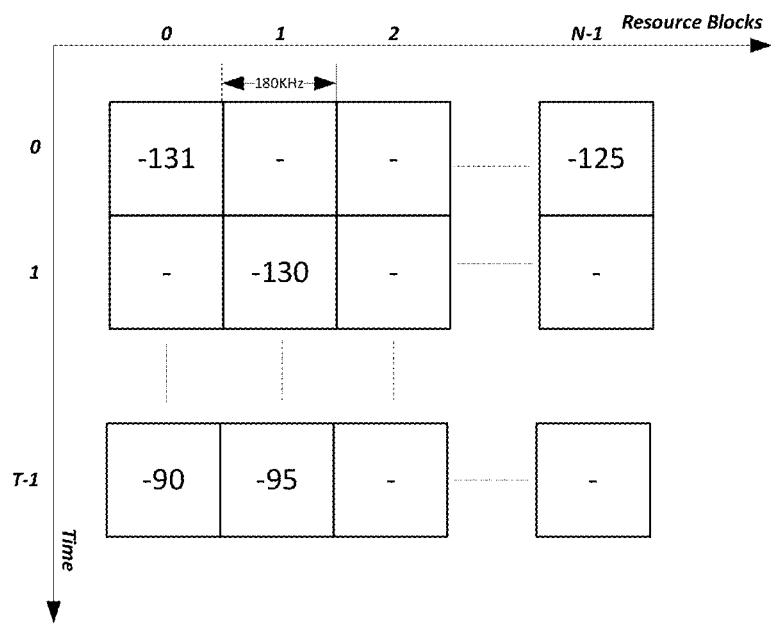

As seen in FIGS. 6A and 6B, the uplink transmission to a base station over the ID period can be represented by a matrix with N columns and T rows. Each element of the matrix uniquely indexes an RB available for downlink transmission. In FIG. 6A, a matrix element with a value of one indicates that a transmission was scheduled on the indexed RB, and a value of zero indicates that no transmission was scheduled.

Figure 7A:
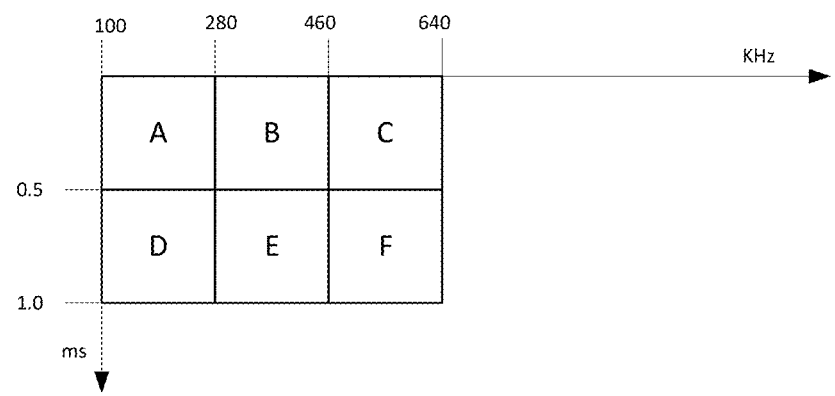
FIGS. 7A and 7B illustrate resource allocation according to an embodiment.
Figure 7B:
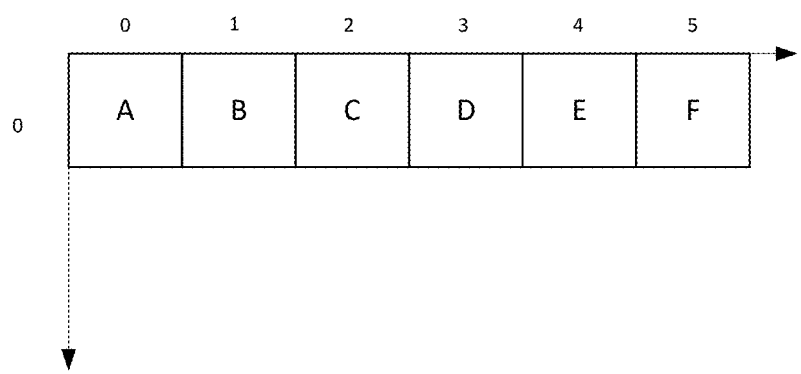

FIGS. 7A and 7B illustrate a relationship between RBs and a transmission matrix in an embodiment. FIG. 7A shows a transmission schedule in time and frequency dimensions. In the example of FIG. 7A, each RB is 180 KHz by 0.5 ms. During the first 0.5 ms of transmission, RBs A, B, and C are transmitted in frequency blocks 100-280 KHz, 280-460 KHz, and 460-640 KHz, respectively. Next, during the second 0.5 ms of transmission, RBs D, E, and F are transmitted in the same frequency blocks.

FIG. 7B shows the same transmissions in a transmission matrix in which N=6. Accordingly, even though actual transmissions of blocks D, E, and F occur after the transmission of blocks A, B, and C, both sets of transmission blocks are arranged in the same row 0. While the time dimension of all RBs is the same in this example (0.5 ms), the actual transmissions occur during two separate time periods.

In an embodiment in which data schedulers are distributed throughout a network at base stations, the scheduler at each base station may create an downlink transmission matrix to keep track of its transmission schedule over the ID time period. The populated transmission matrix is then periodically sent to a centralized NRC. In an embodiment in which the data scheduler is centralized on a computer other than the NRC that analyzes the schedules, the uplink transmission matrices may be transmitted from a data scheduler NRC to an analysis NRC.

FIG. 6B shows hypothetical received signal strength indication (RSSI) dBm values measured in unallocated RBs from the downlink transmission matrix example shown in FIG. 6A. The relationship between the transmission and quiet times of FIG. 6A and the RSSI values of FIG. 6B illustrates the correspondence between quiet times and interference measurement. Although the example in FIG. 6B only shows a single measurement value, it should be noted that in other embodiments multiple values may be measured within a single resource block. Persons of skill in the art will recognize that embodiments other than the specific embodiments shown in FIGS. 6A, 6B, 7A and 7B are possible.

FIG. 8 shows a process 800 for creating a downlink interfering neighbor list (DINL) according to an embodiment. A DINL may be created for all UE in a network, or for selected UE in a network. The selected UE may belong to a UE set as described with respect to process 900 below.

In step 802, the UE measures reference signal levels transmitted from neighboring base stations. For example, in LTE systems, RSRP and RSRQ measurements are made and reported. In UMTS systems, RSCP and Ec/NO measurements are made and reported.

In some networks, these measurements may be conducted on a routine basis as part of cell reselection and handover processes. A serving base station then receives the measured signal strength values from UE attached to that base station in step 804. The serving base station may receive the measured values in response to a request from the base station, or as part of routine communication protocols in a system.

In step 806, the reference signals measured by the UE are compared to a threshold value. Larger threshold values can reduce processing. However, they may not capture all eNodeBs whose transmissions may be observed at a UE and need to be considered for external interference detection at the UE. On the other hand, lower threshold values can increase the amount of eNodeBs that need to be considered for external interference detection. When the signal strength exceeds the threshold value, the base station associated with the measured signal is added to the DINL of the UE which made the measurement in step 808. In an embodiment, step 806 is not performed, and every base station whose reference signal is detected by a UE is added to the DINL of that UE in step 808. Accordingly, in various embodiments a DINL may include 30, 50, or more base stations. Persons of skill in the art will recognize that the magnitude of a DINL varies depending on the location of user equipment, the threshold value, environmental conditions, etc.

In step 810, a DINL is stored for each selected UE. The DINL may be stored at each serving base station, or at a separate NRC.

FIG. 9 shows a process 900 of selecting a set of UE for downlink interference measurements.

A region of interest is determined in step 902. In an embodiment, the ID UE set are all of the UE in a region of interest. The region of interest may be selected by an operator, or may span the extent of an operator's network. In another embodiment, the region of interest may be a particular sector of the coverage area of one or more cells.

For example, the region of interest may be the edge areas of one or more cell. In this example, selecting a region of interest 902 includes identifying UE that are located in edges of the one or more cell's coverage area, and adding the identified cells to an ID UE set. In another embodiment, the region of interest is a region where network performance is degraded, or some other indicator of a possible source of interference being present. In still another embodiment, a network coverage area is segregated into multiple regions of interest, and step 902 includes cycling through a sequence of regions of interest to sequentially measure the network coverage area.

Various processes may be performed to refine an ID UE set. For example, an embodiment may perform a step 904 of comparing the number of base stations present on the DINL of UE to a threshold value, and UE are added to the ID UE set when the number of base stations on the DINL is less than the threshold value. Alternatively, UE are removed from an ID UE set when the number of base stations present on the DINL is greater than a threshold value. Performing step 904 may increase the probability of empty RBs being present in a transmission matrix.

In another embodiment, UE may be arranged on a list in ascending order based on the size of DINL in step 906, and a predetermined number of UE are selected from an upper portion of the list in step 908. Performing processes 906 and 908 may increase the probability of empty RBs being present in a transmission matrix.

In step 910, a particular base station is selected, and UE with the particular base station on their respective DINLs are added to the ID UE set. In some circumstances, the base station may effectively limit the geographical area of the UE ID set, so step 910 may be performed to limit the geographical scope of the UE ID set. In other words, step 910 may correspond to step 902 of selecting a region of interest.

In various embodiments, one or more of the steps 902 to 910 of process 900 may be performed to establish a UE ID set.

Figure 10:
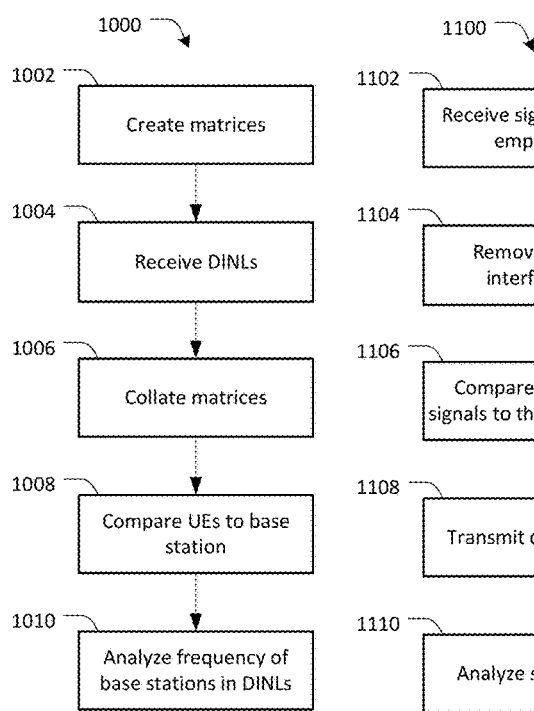
FIG. 10 illustrates a process for identifying empty resource blocks according to an embodiment.

FIG. 10 illustrates a process 1000 of identifying empty resource blocks. In step 1002, matrices as described with respect to FIGS. 6A, 6B, 7A, and 7B above are created.

A data scheduler may be located in different places in different systems. In some systems, one or more central data scheduler is located in an NRC 300, such as data scheduler 314 of FIG. 3. In another system, data schedulers 220 are located at base stations 200. In an embodiment, the data schedulers transmit downlink schedules to a central NRC entity, and the NRC creates matrices from the schedules. In another embodiment, creating matrices 1002 is performed at distributed data schedulers such as data schedulers 220, and the matrices are transmitted to a central NRC.

In step 1004, for each UE in the ID UE set, the corresponding serving base station sends the UE's DINL to the NRC. After performing steps 1002 and 1004, an NRC will have transmission matrices for base stations on the DINLs of the UE in the ID UE set. In an embodiment, step 1004 may be performed before step 1002, so that the NRC can analyze the DINLs of the ID UE set, which may limit the number of schedules and/or matrices that are processed.

When matrices have been received, they are collated in step 1006 to identify resource blocks in which no downlink transmissions are scheduled in any of the eNodeBs in the DINL of a UE in the UE ID set. In an embodiment, step 1006 is performed for each UE individually, so that there is a collated matrix for each separate individual UE. In another embodiment, processing may be minimized by collating a single matrix for limited groups of UE such as UE that have the same or similar DINL, etc. After the downlink transmission matrices are collated, the resulting collated matrix shows RBs in which no downlink transmissions from neighboring base stations are expected to be received by a UE in the ID UE set from base stations on a DINL.

Collating matrices 1006 may be performed by one or more entity. For example, in an embodiment, collation is performed at an NRC. However, the NRC may create matrices based on the DINL maintained by the UE, which may not include transmission data for the serving base station. In this case, a first collation is performed at the NRC based on the DINL, the collated matrix is sent to the serving base station, and a second collation is performed by the serving base station based on its downlink transmission matrix for the same ID period. In another embodiment, one collation is performed at the NRC which includes matrices for base stations on the DINL as well as the serving base station.

In another embodiment, collation of matrices associated with DINLs may be performed at a base station. In such an embodiment, the serving base station may create DINLs for attached UE that are part of an ID UE set, and transmits a list of base stations on the DINLs to a separate scheduler or NRC. The scheduler (or NRC) may then send matrices to the base station, which collates the matrices. In another embodiment, the scheduler transmits schedule data to the serving base station, and the base station makes matrices and collates the matrices.

In an embodiment, step 1008 is performed to compare the number of UEs to the number of base stations on DINLs of the UE, and the results of the comparison are a first value. In an embodiment, the first value is a ratio between the UE and the number of base stations on DINLS of the UE. When the first value exceeds a threshold value, collation is performed at serving base stations.

In an embodiment, step 1010 is performed to analyze the frequency of appearance of specific base stations in DINLs. The frequency of appearance may be compared to a threshold value, and transmission matrices are processed for base stations whose frequency exceeds the threshold value. For example, if 10 UE are attached to a base station and the threshold value is 10%, then only matrices for base stations which appear on DINLs of more than one of the attached UE are processed. In an embodiment, the threshold value may be set as high as 100%.

In another embodiment, the list of neighboring base stations is sorted in descending order based on the frequency. Downlink transmission matrices are requested for the top N number of base stations, where N is less than the number of neighboring base stations in the list. Accordingly, step 1010 may reduce the amount of processing performed in a system. Note that in these two embodiments, only a subset of UEs from the ID UE set is used for external interference measurements.

Several specific examples have been described above for performing various processes at various entities. Persons of skill in the art will recognize that embodiments of the present invention may use one or more of these schemes, and that the scope of the present invention is not limited by which particular entities perform particular steps. Furthermore, aspects of process 1000 may be performed before or after an ID period has expired. When the ID period has expired, an embodiment may analyze stored data from the expired ID period.

Figure 11:
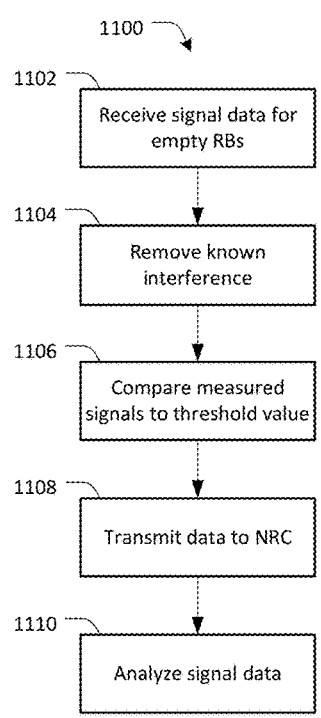
FIG. 11 illustrates a process for measuring interference according to an embodiment.

FIG. 11 illustrates a process 1100 for measuring interference according to an embodiment. In step 1102, signals that are measured by UE during empty RBs of an ID period are received by base stations. In an embodiment, the UE measures the signals in response to a request from the serving base station. In another embodiment, the UE measures signals that are received for all resource blocks in an ID period, and transmits received signal data for all RBs to base stations. In such an embodiment, the base station may separate information received during empty RBs from information received during non-empty RBs.

The signal strength information received in step 1102 may include a single signal strength measurement or multiple signal sample measurements per RB. When known system interference exists in an RB, the effect of the known interference may be removed in step 1104 from the received signal at the UE by receive processing techniques such as using interference-subtraction receivers. In such an embodiment, step 1104 of removing known interference is performed before a base station receives signal data in step 1102. In another embodiment, removing known interference 1104 is performed after the signal data has been received in step 1102.

Signals that are received for empty RBs may be compared to a threshold value in step 1106. The comparison may take place at a UE, in which case signals above the threshold value are transmitted to the base station for subsequent processes, while signals below the threshold value are not transmitted to the base station. In another embodiment, the signals are compared to a threshold value at a base station or other component of the system.

In some Radio Access Technologies (RATs) such a LTE, base stations transmit reference signals in all RBs even if data signals are not transmitted in particular RBs. In such cases, the threshold levels for the RBs may include pre-measured reference signal power levels from neighboring base stations. The UE may also store baseband samples from these empty RBs. The baseband samples may then be sent to the serving base station using uplink data channels.

In another embodiment, the threshold value is the noise power at the UE receiver. Turning to the example of FIG. 6B, assuming that a noise power is about −125 dBm, the signals that exceed the noise power (−90, −95) indicate the presence of interference. A higher threshold value can reduce processing and false positives, while a lower threshold value can increase measurement sensitivity.

After the serving base station collects UE measurement reports from UEs in an ID UE set, the base station may then forward these reports to a separate NRC in step 1108, and the NRC analyzes the signal data in step 1110. In another embodiment, the signals are analyzed at the base station in step 1110.

In step 1110, reports are collated and analyzed to determine the presence of external interference in the network. The location of UEs can be used in conjunction with the measurement reports to geo-locate the external interferer if present. These reports and baseband samples, if available, may also be used to fingerprint or further characterize the external interferer source.

Processes that employ identifying empty RBs in an existing schedule are more effective during low-use situations than when base stations are heavily loaded. When fewer transmissions are present, more quiet times, or empty RBs, exist in a transmission schedule. When usage levels increase, it becomes increasingly difficult to identify empty RBs common to a base station and the base stations on the DINL of UE served by the base station.

Therefore, in some embodiments, it may be desirable to apply a more deliberate detection scheme which focuses on particular times and/or frequencies to canvass a broader swath of resources than would otherwise be available in a random schedule. In other embodiments, a process 1100 may reveal that interference is present in a general range of frequencies and times, and it is desirable to specify additional times and frequencies to more accurately characterize the interference. Accordingly, in an embodiment, it is desirable to influence transmission schedules to increase the amount of empty RBs.

Figure 12:
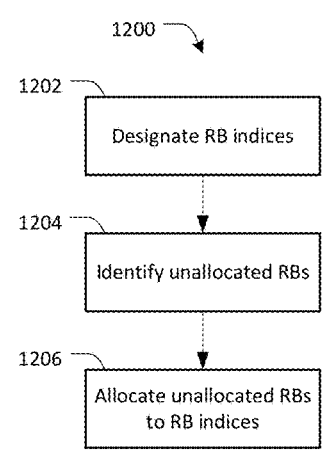
FIG. 12 illustrates a process for coordinating the transmissions of multiple base stations according to an embodiment.

One such embodiment is illustrated by FIG. 12. FIG. 12 illustrates a process 1200 for coordinating the uplink transmissions of multiple base stations. In an embodiment, process 1200 includes step 1202 of designating RB indices. A specific example of designating RB indices using two integer values will now be explained with respect to FIGS. 13A and 13B.

In an embodiment, the NRC specifies two integer parameters, $K_N (\in \{0, \ldots, N-1\})$ and $K_T (\in \{0, \ldots, N-1\})$, to data schedulers. At time t ($t \in \{1, \ldots, T\}$) within the interference detection time period, each data scheduler calculates a scanning index k using the two integer parameters according to the following Equation 1:

$$k(t) = (K_N + tK_T) \bmod N \qquad \text{[Equation 1]}$$

While scheduling uplink transmissions at time t, the data scheduler schedules uplink transmissions on candidate RBs with column indices further way from k(t) before scheduling on candidate RBs with indices near k(t). A candidate RB is an RB which is expected to achieve the desired data transmission rate at the given time. In an embodiment, data may be scheduled on the $k(t)^{th}$ RB only if no other candidate RBs are available. When the network is under-loaded, this scheduling methodology improves the likelihood of empty RBs in the vicinity of the $k(t)^{th}$ RB at time t.

Figures 13A, 13B:
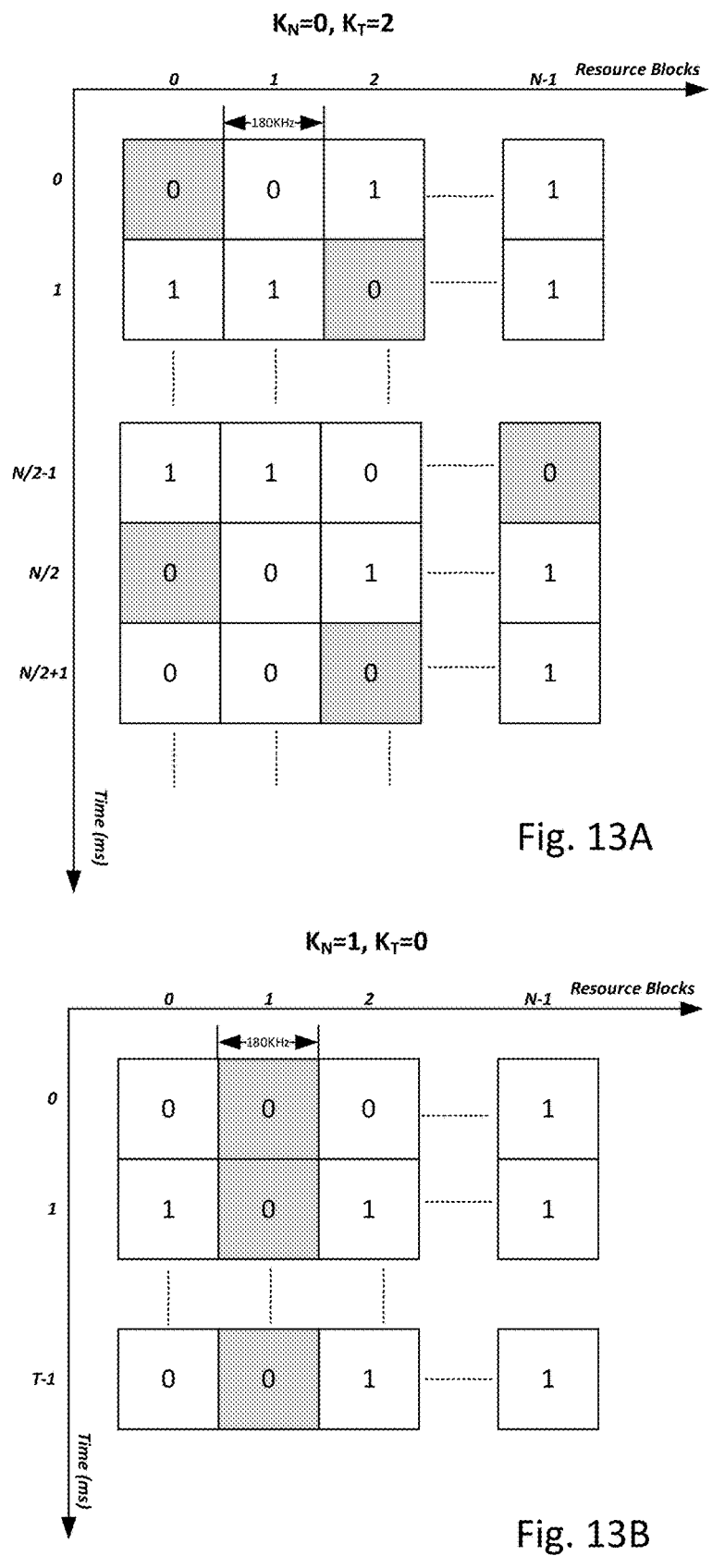

RBs with index k(t) ($t \in \{1, \ldots, T\}$) for two different sets of values for parameters $K_T$ and $K_N$ are shown in FIGS. 13A and 13B. In those figures, the indexed RB elements are shaded. It can be seen that integer $K_T$ effectively determines the rate at which frequency bands are revisited to test for interference. Integer $K_N$ provides an offset that determines which frequency bands are visited to test for interference. These parameters allow an embodiment to trade between the resolution of the frequency/time space scanned for interference and the speed with which it is scanned. Hence, in addition to providing a mechanism to increase the availability of empty RBs for interference scanning, the two parameters provide flexibility in configuring the interference detection and localization scheme for different operational requirements.

In an embodiment, interference detection parameters including the integer parameters $K_N$ and $K_T$ described above may be changed depending on conditions. For example, during initialization, a system may initially scan all frequencies for the presence of interference. In an embodiment using Equation 1, this is achieved by setting $K_N$ to zero and $K_T$ to 1. In this example, interference is detected in an RB with column index p. After interference is detected, the system may reconfigure the detection process to determine characteristics of the interference, such as the periodicity of the interference.

For example, $K_N$ may be set to p and $K_T$ to 0. With these integer values, the $p^{th}$ RB is scanned frequently leading to high resolution in determining the periodicity of the interference. In another embodiment, a process may search the frequency bands for an interferer with a known periodicity of p ms. This may be achieved by setting the parameter $K_T$ such that a frequency bin is revisited every p2 ms and incrementing the offset $K_N$ every consecutive interference detection time period to scan all the frequency bins.

In step 1204, the number of RBs in a transmission is identified in schedule information. The schedule information referred to in step 1204 may be downlink transmission schedule information that has been generated without actively coordinating quiet times between a plurality of base stations. In an embodiment, the schedule information may simply be a list of RBs that are to be allocated or unallocated and that are not organized in any sequence. In other words, in an embodiment, schedule information may simply include information on how many RBs are determined to be active or empty during a given time period.

The schedule information may be generated by different physical entities. In an embodiment in which data schedulers are located in each base station, each base station may generate an individual transmission schedule and transmit that schedule to an NRC, where the collected schedules are the schedule information. In another embodiment, scheduling is conducted centrally by an NRC, and the schedule information may include the schedules of all base stations on one or more DINL.

In step 1206, the unallocated RBs are allocated to the designated RB indices. As noted above, in an embodiment in which the number of unallocated RBs in the schedule information exceeds the number of designated RB indices, the surplus unallocated RBs may be allocated to RBs adjacent in time and/or frequency to the designated RB indices.

The process 1200 for coordinated scheduling uses the availability of unallocated empty RBs in each base station during normal operation. In base stations with heavy downlink traffic, this may not always be the case. Therefore, in an embodiment, RBs may be prioritized for interference scanning. In such an embodiment, a number and location of empty RBs may be mandated in a downlink transmission schedule.

Figure 14:
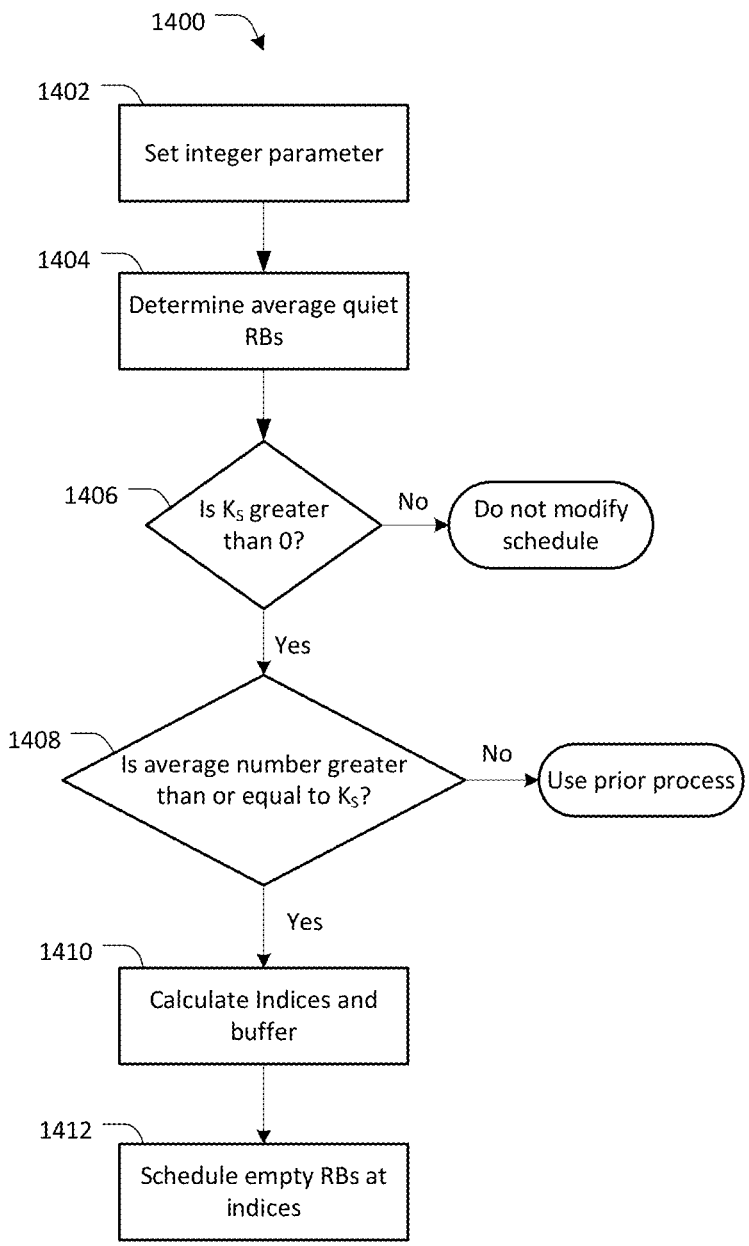
FIG. 14 illustrates a process for interference detection according to an embodiment.

FIG. 14 shows an embodiment of a process for detecting interference in a cellular network that accounts for loading in the network. In step 1402, two integer parameters $K_A \in \{1, 2, \ldots\}$ and $K_S \in \{0, 1, \ldots\}$ are set. In step 1404, for each t ms ($t \in \{1, \ldots, T\}$), an average number of empty RBs is identified over the previous $K_A$ interference detection periods for each UE in the UE ID list. A metric, e(t), is then calculated from these average values. In an embodiment, the metric may be the minimum of the average values. In another embodiment the metric may be the sum of the average values.

In step 1406, for each t ms ($t \in \{1, \ldots, T\}$) of the next interference detection period, if $K_S = 0$, the embodiment simply uses a schedule without any prioritization. In other words, in process 1400, when $K_S$ is zero, interference is detected by analyzing signals measured during empty RBs common to base stations on DINLs.

In step 1408, if $K_S \neq 0$ and $e(t) \geq K_S$, process 1400 uses the scheduling procedure used in the previous interference detection period. However, if $K_S \neq 0$ and $e(t) < K_S$, process 1400 calculates k(t) as described above with respect to Equation 1. In step 1410, a set of indices are calculated according to the following Equation 2:

$$s(t) = \{(k(t)-m) \bmod N, (k(t)-m+1) \bmod N, \ldots, (k(t)+m-1) \bmod N\} \qquad \text{[Equation 2]}$$

In Equation 2, the parameter m controls the number of RBs left empty in the vicinity of k(t) and is given by the following Equation 3:

$$m = \text{ceil}(K_S/2) \qquad \text{[Equation 3]}$$

Process 1400 does not schedule any data transmissions on RBs indexed by the set s(t). Accordingly, in step 1412, empty RBs are scheduled for the indices of s(t). In addition, a buffer corresponding to the parameter m may be set around the empty RBs, which may enhance the accuracy of interference measurements and increase the amount of interference information gathered. In an embodiment, if a base station is under-loaded, it schedules data transmissions at RBs with indices as far away from s(t) as possible.

Aspects of process 1400 can be carried out in different ways in different embodiments. For example, when data schedulers are located at individual base stations, parameter m may be set for each base station according to its current level of loading. In other embodiments, data scheduling may be conducted centrally, so schedules may be set by an NRC.

Process 1400 provides a way to tune the scheduling procedure so that empty slots are allocated in each interference detection period and the positions of unallocated RBs match in each interference detection period.

In an embodiment, the parameter $K_S$ determines the priority for interference scanning over data transmission. A larger value for $K_S$ implies a larger priority for interference scanning. A value of zero implies that interference scanning is not prioritized.

Process 1400 provides a way to dynamically configure the priority of interference detection relative to data transmission. Such an embodiment is especially useful in scenarios where the cellular network is not the primary user of the spectrum and shares the spectrum with agencies that provide mission-critical communications. For example, during emergencies, interference detection (and subsequent avoidance) could be configured to have a greater priority than data transmission. In addition, process 1400 is not exclusive of the other processes described herein, and persons of skill in the art will recognize that various aspects of the processes may be combined in various embodiments.

As mentioned above, elements of the processes discussed above may be performed either before or after a transmission period. UE may measure signals across the duration of a time period, and subsequent analysis may determine which measurements coincided with empty RBs.

In another embodiment, downlink transmission matrices are sent by the data scheduler(s) to an NRC before the base stations transmit in an ID time period. Empty RBs are then identified for the UEs in the ID UE set of a serving base station. Once empty RBs are identified, the serving base station instructs UEs in the ID UE set to make signal measurements in these identified empty RBs during the ID period. The BS transmits in the ID period only after this process is complete. Such an embodiment precludes UEs in the ID UE set from making measurements if no empty RBs are available for the UE.

Although aspects of certain processes are described as taking place using specific equipment in certain specific situations, persons of skill in the art will recognize that in other embodiments other processes may be performed using other equipment without departing from the scope and spirit of the present invention. For example, certain scheduling activities may be performed by a base station in one embodiment and an NRC in another embodiment. Accordingly, the term "one or more computer readable media" encompasses embodiments in which processes may be performed by a single processing core at a single physical location, as well as embodiments in which the processes are performed by a plurality of processing cores at a plurality of physical locations based on instructions encoded on a corresponding plurality of computer readable media.

What is claimed is:

1. A method of detecting downlink interference that is external to a cellular telecommunications network comprising a plurality of cells, the method comprising:
generating, for each user equipment (UE) of a plurality of UE of the cellular telecommunications network, respective downlink interference neighbor lists by analyzing measurements of signals transmitted by neighboring base stations in the cellular telecommunications network;
selecting a set of UE for measuring the external interference from the plurality of UE;
identifying, for each downlink interference neighbor list, empty resource blocks that are common to base stations of the downlink interference neighbor list by collating transmission matrices of the base stations of the downlink interference neighbor list after performing measurements of the external interference by the set of UE; and
analyzing, by a computer processor, the external interference received by the set of UE during the empty resource blocks.

2. The method of claim 1, wherein generating the respective downlink interference neighbor lists includes:
receiving measurement data from each UE, the measurement data including measurements of reference signals from all base stations received by each UE,
wherein every base station whose reference signal is received by a respective UE above a threshold value is added to the downlink interference neighbor list of the respective UE.

3. The method of claim 1, wherein the empty resource blocks are common to every base station of the downlink interference neighbor list of the selected set of UE.

4. The method of claim 1, wherein the respective downlink interference neighbor lists are created by:
receiving neighboring base station signals from each UE of the plurality of UE;
comparing the neighboring base station signals to a threshold value; and
when a given neighboring base station signal exceeds the threshold value, adding a base station associated with the base station signal to a downlink interfering neighbor list of the UE that detected the base station signal.

5. The method of claim 1, further comprising:
determining a geographical location associated with a source of the external interference.

6. The method of claim 1, further comprising:
determining a geographical location associated with a source of the external interference based on geographical coordinates and signal strength measurements of UEs that detected the external interference.

7. The method of claim 1, wherein the external interference is received from an entity that is not licensed to use RF spectrum that is licensed to the cellular telecommunications network.

8. The method of claim 1, wherein selecting the set of UE comprises:
designating a group of UE in a region of interest; and
adding the UE in the region of interest to the set of UE.

9. The method of claim 8, wherein the region of interest is a region where network performance is degraded.

10. The method of claim 1, wherein selecting the set of UE comprises:
comparing a number of base stations on a downlink interference neighbor list for a first UE to a threshold value; and
only adding the first UE to the set of UE when the number of base stations is less than the threshold value.

11. The method of claim 1, wherein selecting the set of UE comprises:
arranging a plurality of UE in ascending order according to a number of base stations on each downlink interference neighbor list of the plurality of UE;
adding UE from an upper portion of the list to the set of UE; and
excluding a lower portion of the list from the set of UE.

12. The method of claim 1, wherein selecting the set of UE comprises:

designating a first base station;

determining whether the first base station is on a downlink interference neighbor list of a first UE; and when the first base station is on the downlink interference neighbor list of the UE, adding the first UE to the set of UE, such that every UE that has the first base station on its respective downlink interference neighbor list is added to the set.

13. The method of claim 1, further comprising:

comparing a number of UE attached to a first base station to a number of base stations on downlink interfering neighbor lists of the UE to generate a first value;

when the first value exceeds a threshold value, collating the transmission matrices at the first base station; and when the first value is less than the threshold value, collating the transmission matrices at a central computing device.

14. The method of claim 1, further comprising:

determining a frequency at which a first base station appears on downlink interfering neighbor lists of a plurality of UE of the set of UE; and comparing the frequency to a threshold value, wherein only base stations whose frequency exceeds the threshold value are included in the collating.

15. The method of claim 1, further comprising:

removing known interference from the signals received by the set of UE during the empty resource blocks.

16. The method of claim 1, further comprising:

allocating resources of a base station to change a location of empty resource blocks in a transmission schedule.

17. The method of claim 1, wherein all base stations on each UE's respective downlink interference neighbor list are base stations whose reference signals were detected by each respective UE.

18. A system for identifying interference that is external to a cellular network comprising a plurality of cells, the system comprising:

a plurality of base stations;

a memory;

a processor; and one or more non-transitory computer readable medium associated with the processor, the one or more non-transitory computer readable medium having computer executable instructions stored thereon which, when executed by an associated one or more processor, perform the following steps:

generating, for each user equipment (UE) of a plurality of UE of the cellular telecommunications network, respective downlink interference neighbor lists by analyzing measurements of signals transmitted by neighboring base stations of the cellular network;

selecting a set of EE for measuring the external interference from the plurality of UE;

identifying, for each downlink interference neighbor list, empty resource blocks that are common to base stations of the downlink interference neighbor list by collating transmission matrices of the base stations of the downlink interference neighbor list after performing measurements of the external interference by the set of UE; and analyzing, by a computer processor, the external interference received by the set of UE during the empty resource blocks.

* * * * *